Patented Aug. 12, 1941

2,252,401

UNITED STATES PATENT OFFICE 2,252,401

AMINE DERIVATIVES OF SULPHODICARBOXYLIC ACIDS

Alphons O. Jaeger, Mount Lebanon, Pa., assignor to American Cyanamid & Chemical Corporation, New York, N. Y., a corporation of Delaware No Drawing. Original application April 15, 1937, Serial No. 137,028. Divided and this application April 23, 1938, Serial No. 203,817

9 Claims. (Cl. 260—326)

This invention relates to amine derivatives of aliphatic sulphodicarboxylic acids and more particularly to the amides, imides, aminic acids and aminic acid esters of organic dicarboxylic acids of the formula

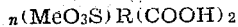
$$n(\text{MeO}_3\text{S})\text{R}(\text{COOH})_2$$

in which R may be an unsubstituted or substituted aliphatic, or alicyclic radical, for instance a radical having one or more halogens or hydroxy groups, and where COOH denotes the carboxylic acid group, MeO₃S the free sulphonic acid group or a salt thereof, and $n$ is an integer which is 1 or 2. The invention includes the new products themselves, their methods of preparation, and wetting, scouring, emulsifying and detergent compositions containing them.

I have found that organic aliphatic sulphodicarboxylic acids of the above defined class can be reacted with amines to produce compounds other than the mono- or diamine salt. I have found that, by employing the proper reagents and reaction conditions, these acids can be reacted with amines to produce amides and aminic acids or imides and that they can also be reacted with a mixture of an organic hydroxy compound and an amine to produce aminic esters.

A wide range of sulphodicarboxylic acids may be used for the above described reactions to produce amine derivatives. These acids may be such aliphatic sulphodicarboxylic acids as mono- and disulphosuccinic, sulphochlorsuccinic, sulphoadipic, sulphopyrotartaric, sulphoglutaric, sulphosuberic, sulphosebacic, sulphomaleic, sulphofumaric, sulphodimethyl succinic, sulphomethyl glutaric, sulphopimelinic, sulphopropyl succinic, sulphophenyl succinic, sulphooctyl glutaric and other sulphonated carboxylic acids of the aliphatic series. Cyclic aliphatic sulphonic acids such as alphasulpho, phenyl succinic acid, phenyl sulphosuccinic acid, 4-chlorophenyl sulphosuccinic acid and the like may also be used as well as such sulpho acids as are derived from dicarboxylic acids obtained by the Diels-Alder diene condensation of an unsaturated compound containing a conjugated system of double bonds with a diene carboxylic acid. Sulpho acids of decarboxylated polycarboxylic acids obtainable from the diene condensation may also be used. In general, any aliphatic sulphodicarboxylic acid of this type may be used to produce amine derivatives in accordance with the present invention but the compounds of greatest commercial value are obtained from sulphonated orthodicarboxylic acids.

The sulphonated dicarboxylic acids may be obtained in any known or approved manner, as by sulphonating an unsulphonated dicarboxylic acid with a suitable sulphonating agent such as sulphuric acid, chlorsulphonic acid, oleum or the like, or by adding a sulphite or bisulphite to the corresponding unsaturated aliphatic or cyclic aliphatic acid or its salt, or by reacting a halogen substituted dicarboxylic acid salt with a sulphite. In many cases corresponding sulphonated dicarboxylic acid amine derivatives may also be obtained by sulphonation of the unsulphonated amine derivatives by one or more of the above methods, and particularly by adding a sulphite or bisulphite to an unsaturated aliphatic amine derivative and this novel method of preparation constitutes an important feature of the invention.

The amines which may be employed to produce derivatives other than the neutral salts of sulphodicarboxylic acids may be primary or secondary aliphatic isocyclic, heterocyclic and alicyclic mono or poly amines which may be unsubstituted or substituted by one or more halogen, hydroxy, etherified hydroxy groups and the like.

The mono derivatives may be prepared by condensing a sulphodicarboxylic acid or an anhydride or an oxyhalide or an acid ester thereof with suitable amine or a suitable mixture of amines of this class.

A great variety of amino compound derivatives of dicarboxylic acids is obtainable. I will therefore limit my description to the groups of compounds which fall within the scope of this invention. It is of course understood that my invention is not limited by the limited number of examples but that the examples will give an outline of the extent to which derivatives of the nature in question have been found useful for the purpose of this invention, so that those versed in the art can interpret the subject according to the present state of the art.

Nitrogen-containing aliphatic sulphodicarboxylic acid derivatives other than the neutral salts only of primary and secondary amines are considered to be within the scope of the invention. Amines when caused to react with a sulphodicarboxylic acid can form the monoamine salt or the diamine salt. Both these groups of compounds are excluded from my invention since I only contemplate amides, imides, aminic acids, aminic acid amine salts, aminic acid esters and acid ester amine salts to include in my invention.

Primary amines only are able to form imides and I therefore only contemplate primary amines for the formation of imides of sulphodicarboxylic acids. In reacting a primary amine with an aliphatic sulphodicarboxylic acid or its anhydrides or an oxyhalide, these amino derivatives may be formed: The aminic acid amine salt, the aminic acid, the amide, the imide or a mixture of these compounds. Primary amines used may be alkylamines, such as methyl, ethyl, propyl, etc. amines or the amines of higher aliphatic hydrocarbons such as amyl, hexyl, octyl, nonyl, unadecyl, lauryl, cetyl and stearyl amine, or, arylamines such as aniline, a-naphthylamine or an aralkylamine such as benzylamine or octyl phenyl amine and the like. Also a mixture of these amines may be used to advantage to prepare desirable primary monoamine derivatives.

An imide may also be prepared according to Gabriel's synthesis by subjecting a suitable potassium salt of the imide of a sulphodicarboxylic acid, i. e. a compound of the formula

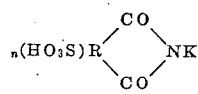

to reaction with an alkyl halide or an aralkyl halide, or an alkylene dihalide or an aralkylene dihalide. A great variety of imido compounds can be prepared, according to Gabriel's synthesis. Obviously Gabriel's reaction is applicable to form a wide variety of imide derivatives, such as for instance the alkylolimide of an aliphatic sulphodicarboxylic acid. Both the amino alkyl imides and the alkylol imides of aliphatic sulphodicarboxylic acids are capable of further reactions to obtain compounds which have been found useful as wetting and emulsifying agents in the process which is the object of this invention.

Thus the amino alkyl imide may be condensed with a second sulphodicarboxylic acid to a diimide, or to an alkyl aminic acid imide, or to an alkyl amide imide, or it may be condensed with a monocarboxylic acid to form an alkylamide imide. It may also be condensed with dicarboxylic acids such as phthalic and maleic acids.

Furthermore, an alkylol imide may be esterified with a second sulphodicarboxylic acid to form an alkyl imide acid sulphodicarboxylic acid ester or a di(alkyl imide) sulphodicarboxylic acid ester, or it may be esterified with any dicarboxylic acid to form an alkyl imide acid dicarboxylic acid ester or a di(alkyl imide) dicarboxylic acid ester, or it may be esterified with a monocarboxylic acid to form an alkyl imide carboxylic acid ester or it may be esterified with a hydroxy carboxylic acid to form an alkyl imide hydroxycarboxylic acid ester, or it may be esterified with an aminic acid to form an alkyl imide aminic acid ester. Members of several groups of these compounds have been prepared and have been found useful for the purpose of the invention. Having now considered a few examples of the wide variety of imide derivatives which can be formed from sulphodicarboxylic acids and primary mono- or polyamines, I will now turn to the special case of amide derivatives.

An aminic acid which is also often called an acid amide is formed by reacting one equivalent of a primary or a secondary monoamine with one mol of a sulphodicarboxylic acid. Aminic acids of a primary amine or a primary amino derivative such as an alkylolamine or a diamine may also be prepared by partially hydrolyzing a sulphodicarboxylic acid imide derivative.

Another type of amide contemplated in this invention is often called a diamide. It is generally prepared by reacting two equivalents of a primary or secondary mono- or poly-amine with one mol of a sulphodicarboxylic acid or preferably an anhydride thereof. According to the time, temperature and other conditions of the reaction, an aminic acid amine salt or an amide or a mixture of both of these compounds may be obtained. If a mixture of e. g. two amines is used in such a reaction mixed amides or, according to the conditions under which the reaction is carried out, a mixture of mixed amines with aminic acid amine salts may be obtained. Amides may also be obtained by reacting an imide with a primary or a secondary amine.

A great variety of compounds is thus obtainable, the number depending on the multitude of the original amino compounds which are subjected to the reaction with the aliphatic sulphodicarboxylic acid. In addition to primary or secondary monoamines, derivatives of alkylolamines may be used as such or in the form of their derivatives, i. e., their esters with carboxylic acids or their ethers.

Secondary amines can be of the most varied types. They may be dialkylamines such as dimethylamine, diethyl, dipropyl and other dialkylamines, or they can be mixed alkylamines such as methyl ethyl amine, methyl propyl amine, ethyl propyl amine, ethyl lauryl amine or propyl stearyl amine, or lauryl stearyl amine or the like. They furthermore can be aromatic amines such as diphenyl amine or dinaphthylamine or a phenyl naphthylamine or they can be of the aliphatic aromatic mixed type such as methyl aniline, butylaniline, octylaniline, laurylaniline, etc.

An additional group of amines is available for condensation with sulphodicarboxylic acids. It is the group of polyamines the derivatives of which are included in this invention as long as the polyamine contains at least one primary or secondary amino group.

Amines belonging to this group are such primary alkyl diamines as methylene diamine, ethylene diamine, a propylene diamine, tetramethylene diamine, pentamethylene diamide, octamethylene diamine, dodecamethylene diamine. Examples of aromatic diamines are: Phenylene diamine, benzidine, a diamino toluol, a diamino ethylbenzene, a diamino xylene, an amyl phenylene diamine, a naphthylene diamine, an ethyl naphthylene diamine, a diamino diphenyl ethane, a tolidine, a diamino stilben, an anthradiamine, an amino (aminophenyl) naphthalin, a diamino triphenyl methane, a hexahydrophenylene diamine, a diamino menthane.

Other suitable aliphatic diamines are N-methyl-methylene diamine, N-octyl-methylene diamine, N-octyl-octa-methylene diamine, N-lauryl octa methylene diamine, N-methyl dodecamethylene diamine. Examples of suitable diamines of the aliphatic aromatic series are N-methyl phenylene diamine or generally a N-alkyl phenylene (or more generally arylene) diamine, a N-aryl alkylene diamine, or N-N'dialkyl arylene diamines, or N.N'diaryl alkylene diamines. Other polyamines are for instance a triamino benzene, or a triaminopropane, or generally an amino arylene diamino, or an amino alkylene diamine or an N-alkyl or N-aryl substituted derivative therefrom.

Among the most important commercial amines are alkoxy amines such as the mono-, di- and tri-ethanol amines. When this class of compounds is reacted with sulphodicarboxylic acids, derivatives are obtained which may be amides or aminic acids or mixtures of these compounds.

The invention will be illustrated in greater detail by the following specific examples. It is understood, however, that these examples are for illustrative purposes and the invention in its broader aspects is limited only by the scope of the appended claims.

*Example 1*

A mixture of 224 parts of monosodium sulphosuccinic acid, 185 parts of lauryl amine and 400 parts of high-flash naphtha (boiling point 150–170° C.) is heated with good agitation at 165–180° C. The water of reaction is continually removed by means of a distillation trap. Heating is discontinued when 36 parts of water have been given off. The product is filtered off and washed with 25 parts of benzene to remove adhering oily and colored materials. The air-dried purified reaction product consists of 260 parts of nearly pure lauryl sodium sulphosuccinimide of the probable structural formula

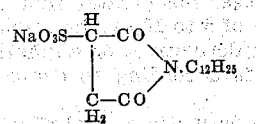

*Example 2*

A mixture of 120 parts of octyl aniline and 29.4 parts of maleic anhydride are heated to 190–240° C. under a pressure of 35 mm. for 30 minutes.

To 138.4 parts of the above compound are added 34.2 parts of sodium bisulphite, 35 parts of water and 56 parts of 94% alcohol. This mixture is heated under a reflux condenser until a sample will dissolve in water to give a clear solution. 1 part of wood charcoal is added and the heating continued for 30 minutes. The mixture is filtered and the alcohol distilled off. The product is dried at 110° C. 134 parts of pure sodium sulphosuccinyl dioctylanilide are obtained having the probable structural formula

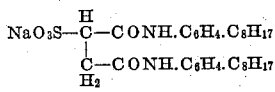

*Example 3*

A mixture of 98 parts of maleic anhydride and 157 parts of diamyl amine is heated at 110° C. for 15 minutes. 143 parts of octyl alcohol and 25 parts of toluene are added and the mixture heated 3–4 hours at 150–185° C. The water of reaction is continually removed by means of a distillation trap. The low boiling materials are distilled off at 3 mm. pressure. 338 parts of maleic diamylaminic acid octyl ester are obtained. To 367 parts of the above compound are added 114 parts of sodium bisulphite, 114 parts of water and 183 parts of 95% alcohol. The mixture is heated under a reflux until a sample will give a clear solution when added to water. The excess bisulphite is filtered off and the alcohol distilled from the filtrate. The paste when dried at 130° C., yields 475 parts of sodium sulphosuccinic diamylaminic acid octyl ester of the probable structural formula

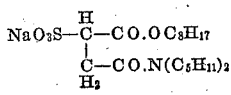

*Example 4*

352 parts of the dicarboxylic acid obtained from the partial decarboxylation of (1) heptylcarboxyl (1)-(3) hexyl (o) tetrahydrophthalic acid are esterified with 193.8 parts of amyl alcohol. .44 part of sulphuric acid is used as a catalyst and 150 cc. of toluene to facilitate removal of the water by distillation into a distillation trap. The reaction requires 3–4 hours heating at 150–185° C. The toluene and excess alcohol are removed by distillation at 30 mm. pressure.

To 492 parts of the above ester are added 278 parts of oleum containing 80 parts of sulphur trioxide. The temperature is kept below 18° C. by external cooling and slow addition of the oleum. 250 parts of cold 30% Glauber's salt solution are added, and allowed to separate. The salt solution is drawn off from the bottom. 324 parts of 30% caustic soda are added to completely neutralize the mixture. 180 parts of water are removed by distillation. 120 parts of (95%) alcohol are added and the precipitated sodium sulphate filtered off. The alcohol is distilled off and the paste dried to give 505 parts of nearly pure product of the probable structural formula

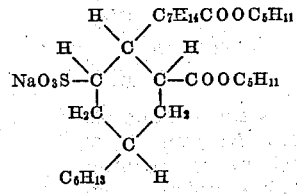

A like product can be made using the dicarboxylic acid formed by condensing crotonic acid with octadecadiene (9–11) acid. (1).

*Example 5*

To 352 parts of the acid described in Example 4 are added 86 parts of monoamylamine and 50 parts of xylene. The mixture is transferred to a still and heated at 200° C. until 36 parts of water are distilled off. The mixture is placed in a vessel fitted with an external means of cooling and oleum containing 80 parts of sulphuric anhydride is added at such a rate as to keep the temperature below 10° C. 250 parts of ice water are added and the mixture neutralized with 30% sodium hydroxide. 260 parts of water are distilled off and 150 parts of alcohol added. The precipitated sodium sulphate is filtered off and the alcohol distilled off. The aqueous paste when dried yields 490 parts of sulphonated imide of the probable structural formula

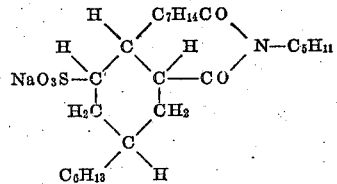

*Example 6*

To 460 parts of the di-diethylamide of the acid described in Example 4 is added slowly, with cooling, oleum containing 80 parts of sulphuric anhydride. The temperature is kept below 18° C. 250 parts of ice water are added and the mixture neutralized with 30% sodium hydroxide solution. 260 parts of water are distilled off and 500 parts of ethyl alcohol added. The precipitated sodium sulphate is filtered off and the alcohol distilled off. The aqueous paste is evaporated to yield 491 parts of sulphonated diamide of the dicarboxylic acid having the probable structural formula

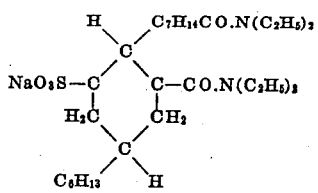

This is a division of my copending application, Serial No. 137,028 filed April 15, 1937.

What I claim is:

1. Amine derivatives of aliphatic sulphodicarboxylic acids, said derivatives consisting of those having the formula of the group consisting of

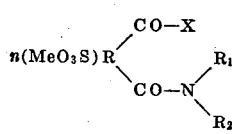

and

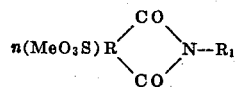

wherein R is the residue of an aliphatic dicarboxylic acid, $R_1$ and $R_2$ are members of the group consisting of hydrogen and monovalent amine forming radicals, and —CO—X is a radical taken from the group consisting of carboxyl and salts and esters thereof, and in which $n$ is an integer not greater than 2, and Me is a member of the group consisting of hydrogen and salt-forming radicals.

2. Amine derivatives of sulphodicarboxylic acids according to claim 1 in which $R_1$ is an alkyl group.

3. Amine derivatives of sulphodicarboxylic acids according to claim 1 in which $R_1$ is an alkyl group of at least 5 carbon atoms.

4. Amine derivatives of aliphatic sulphodicarboxylic acids of the formula

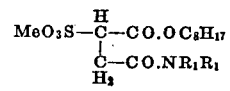

in which $R_1$ is a member of the group consisting of hydrogen and monovalent amine-forming radicals and Me is a member of the group consisting of hydrogen and salt-forming radicals.

5. Amine derivatives of aliphatic sulphodicarboxylic acids of the formula

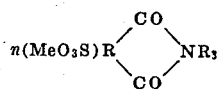

where R is the residue of an aliphatic dicarboxylic acid, Me is a member of the group consisting of hydrogen and salt-forming radicles, $n$ is an integer not greater than 2 and $R_3$ is an alkyl group of 5 to 18 carbon atoms.

6. Amine derivatives of aliphatic sulphodicarboxylic acids according to claim 5 in which $n$ equals 1.

7. Amine derivatives of aliphatic sulphodicarboxylic acids of the formula

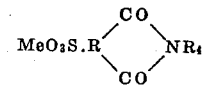

where R is the residue of an aliphatic dicarboxylic acid, Me is a member of the group consisting of hydrogen and salt-forming radicles, and $R_4$ is an alkylol group.

8. Amine derivatives of sulphodicarboxylic acids according to claim 1 in which $R_1$ is an alkylol group.

9. Amine derivatives of sulphodicarboxylic acids according to claim 1 in which $R_1$ is an alkylamine group.

ALPHONS O. JAEGER.